(12) United States Patent
Spaccapietra et al.

(10) Patent No.: US 11,697,312 B2
(45) Date of Patent: *Jul. 11, 2023

(54) STABILIZER STRUCTURE FOR A TREAD OF A TIRE

(71) Applicant: The Goodyear Tire & Rubber Company, Akron, OH (US)

(72) Inventors: Ettore Passante Spaccapietra, Ettelbruck (LU); Philippe Joseph Auguste Muller, Champlon (BE); Marco Nicolò Coccon, Luxembourg Ville (LU); Lionel Jean-Marie Bortolet, Longwy (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/027,739

(22) Filed: Sep. 22, 2020

(65) Prior Publication Data

US 2022/0088970 A1     Mar. 24, 2022

(51) Int. Cl.
   *B60C 11/03*     (2006.01)
(52) U.S. Cl.
   CPC ...... *B60C 11/0327* (2013.01); *B60C 11/0323* (2013.01); *B60C 2011/0334* (2013.01); *B60C 2011/0341* (2013.01)
(58) Field of Classification Search
   CPC ... B60C 11/03; B60C 11/042; B60C 11/0327; B60C 11/0323; B60C 2011/0334; B60C 2011/0341
   See application file for complete search history.

(56) References Cited

U.S. PATENT DOCUMENTS

| | | | |
|---|---|---|---|
| 3,586,086 | A | 6/1971 | Clermont-Ferrand |
| 4,284,115 | A | 8/1981 | Ohnishi |
| 4,481,993 | A | 11/1984 | Ohnishi |
| 4,550,756 | A | 11/1985 | Hinkel |
| 4,832,099 | A | 5/1989 | Matsumoto |
| 5,044,414 | A | 9/1991 | Ushikubo |
| 5,127,455 | A | 7/1992 | Remick |
| 5,152,854 | A | 10/1992 | Matsumoto |
| 5,297,604 | A | 3/1994 | Lurois |

(Continued)

FOREIGN PATENT DOCUMENTS

| | | |
|---|---|---|
| EP | 2722199 A1 | 4/2014 |
| GB | 2038729 A | 7/1980 |
| JP | 2002029221 * | 1/2002 |

OTHER PUBLICATIONS

EPO search report received by Applicant dated Feb. 9, 2022.

*Primary Examiner* — Alison L Hindenlang
*Assistant Examiner* — Debjani Roy
(74) *Attorney, Agent, or Firm* — June E. Rickey; Robert N. Lipcsik

(57) ABSTRACT

A tread for a tire includes a first circumferential main groove, a second circumferential main groove, a third circumferential main groove, and a fourth circumferential main groove. The fourth main groove has a stabilizing structure for increasing tread stiffness. The stabilizing structure has a circumferentially extending subgroove in a radially innermost bottom of the fourth circumferential main groove. The subgroove is axially offset a predetermined amount from a centerline of the fourth circumferential main groove.

13 Claims, 5 Drawing Sheets

(56) References Cited

U.S. PATENT DOCUMENTS

| | | | |
|---|---|---|---|
| 5,658,404 A | 8/1997 | Brown et al. | |
| 5,679,185 A | 10/1997 | Tanaka | |
| 5,957,179 A | 9/1999 | Graas | |
| 6,206,064 B1 | 3/2001 | Takahashi | |
| 6,264,453 B1 | 7/2001 | Jacobs et al. | |
| 7,234,497 B2 | 6/2007 | Yamane | |
| 7,337,816 B2 | 3/2008 | Canankamp et al. | |
| 7,546,861 B2 | 6/2009 | Nguyen et al. | |
| 7,628,880 B2 | 12/2009 | Vervaet | |
| 7,669,624 B2 | 3/2010 | Yagita | |
| 8,511,357 B2 | 8/2013 | Matsumoto | |
| 8,740,596 B2 | 6/2014 | Miyazaki et al. | |
| 8,910,682 B2 | 12/2014 | Ueda | |
| 9,027,615 B2 | 5/2015 | Dermience et al. | |
| 9,033,011 B1 | 5/2015 | Muthigi et al. | |
| 9,102,112 B2 | 8/2015 | Takada | |
| 9,278,582 B2 | 3/2016 | Stuckey | |
| 9,463,672 B2 | 10/2016 | Mathonet et al. | |
| 9,550,396 B2 | 1/2017 | Fries et al. | |
| 9,555,668 B2 | 1/2017 | Oono | |
| 2009/0301622 A1* | 12/2009 | Brown | B60C 11/047 |
| | | | 152/209.19 |
| 2012/0199258 A1 | 8/2012 | Clayton et al. | |
| 2016/0272012 A1 | 9/2016 | Morgan et al. | |
| 2018/0056729 A1 | 3/2018 | Young et al. | |
| 2018/0345733 A1* | 12/2018 | Ooba | B60C 11/1236 |
| 2019/0001755 A1* | 1/2019 | Okuno | B60C 11/1323 |
| 2019/0168546 A1* | 6/2019 | Jones | B60C 11/042 |
| 2019/0232722 A1 | 8/2019 | Becker et al. | |
| 2020/0262243 A1 | 8/2020 | Nugier et al. | |

\* cited by examiner

STABILIZER STRUCTURE FOR A TREAD OF A TIRE

FIELD OF INVENTION

The present invention relates to a pneumatic tire, and more specifically, to a tread for a pneumatic tire.

BACKGROUND OF THE INVENTION

A construction may be adopted in conventional pneumatic tires in which, when a cross-section is viewed from a tire meridian direction, a contact patch of a shoulder rib arches and forms a convex on an inner side of a tire radial direction. Due to this construction, contact pressure of the tire may be distributed evenly over a center region and a shoulder region of a tread portion and uneven wear of the tire may be suppressed.

SUMMARY OF THE INVENTION

A tread for a tire, in accordance with the present invention, includes a first circumferential main groove, a second circumferential main groove, a third circumferential main groove, and a fourth circumferential main groove. The fourth main groove has a stabilizing structure for increasing tread stiffness. The stabilizing structure has a circumferentially extending subgroove in a radially innermost bottom of the fourth circumferential main groove. The subgroove is axially offset a predetermined amount from a centerline of the fourth circumferential main groove.

According to another aspect of the tread, the subgroove has a curved, cylindrical radially innermost surface for mitigating cracking and increasing axial flexibility of the stabilizing structures.

According to still another aspect of the tread, an axial width of the subgroove shrinks to 0.0 mm under a predetermined operating condition.

According to yet another aspect of the tread, the subgroove has a first sidewall and a second sidewall interconnected by the curved, cylindrical radially innermost surface of the subgroove.

According to still another aspect of the tread, the first sidewall abuts the second sidewall under the predetermined operating condition.

According to yet another aspect of the tread, relative motion between the first sidewall and the second sidewall is prevented by a wavy configuration of the first sidewall and a corresponding wavy configuration of the second sidewall.

A method in accordance with the present invention stiffens a tire tread. The method comprises the steps of: extending a first circumferential main groove across the tire tread; extending a second circumferential main groove across the tire tread; circumferentially extending a subgroove across a radially innermost cylindrical bottom surface of the first main groove; axially offsetting the subgroove a predetermined amount from a centerline of the second circumferential main groove; and curving a radially innermost surface of the subgroove. The radially innermost surface of the subgroove being radially inside the radially innermost cylindrical bottom surface of the first main groove. sidewall under the predetermined operating condition.

According to another aspect of the method, the curved radially innermost surface of the subgroove mitigates cracking and increases axial flexibility of the first main groove.

According to still another aspect of the method, an axial width of the subgroove shrinks to 0.0 mm under a predetermined operating condition.

According to yet another aspect of the method, the subgroove has a first sidewall and a second sidewall interconnected by the curved radially innermost surface of the subgroove.

According to still another aspect of the method, a further step includes abutting the first sidewall against the second sidewall under the predetermined operating condition.

According to yet another aspect of the method, relative motion between the first sidewall and the second sidewall is prevented by a wavy configuration of the first sidewall and a corresponding wavy configuration of the second sidewall.

A system in accordance with the present invention increases cornering stiffness of a tire tread. The system includes a first circumferential main groove, a second circumferential main groove, and a stabilizing structure for increasing tread stiffness. The stabilizing structure has a circumferentially extending subgroove in a radially innermost bottom of the first main groove. The subgroove is axially offset a predetermined amount from a centerline of the second circumferential main groove.

According to another aspect of the system, the subgroove has a curved, cylindrical radially innermost surface for mitigating cracking and increasing axial flexibility of the stabilizing structures.

According to still another aspect of the system, an axial width of the subgroove shrinks to 0.0 mm under a predetermined operating condition.

According to yet another aspect of the system, the subgroove has a first sidewall and a second sidewall interconnected by the curved, cylindrical radially innermost surface of the subgroove.

According to still another aspect of the system, the first sidewall abuts the second sidewall under the predetermined operating condition.

According to yet another aspect of the system, relative motion between the first sidewall and the second sidewall is prevented by a wavy configuration of the first sidewall and a corresponding wavy configuration of the second sidewall.

Definitions

"Apex" means an elastomeric filler located radially above the bead core and between the plies and the turnup ply.

"Annular" means formed like a ring.

"Aspect ratio" means the ratio of a tire section height to its section width.

"Aspect ratio of a bead cross-section" means the ratio of a bead section height to its section width.

"Asymmetric tread" means a tread that has a tread pattern not symmetrical about the centerplane or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Net contact area" means the total area of ground contacting elements between defined boundary edges divided by the gross area between the boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

BRIEF DESCRIPTION OF THE DRAWINGS

The present invention will be better understood through reference to the following description and the appended drawings, in which.

DETAILED DESCRIPTION OF EXAMPLES OF THE PRESENT INVENTION

Figure 1:
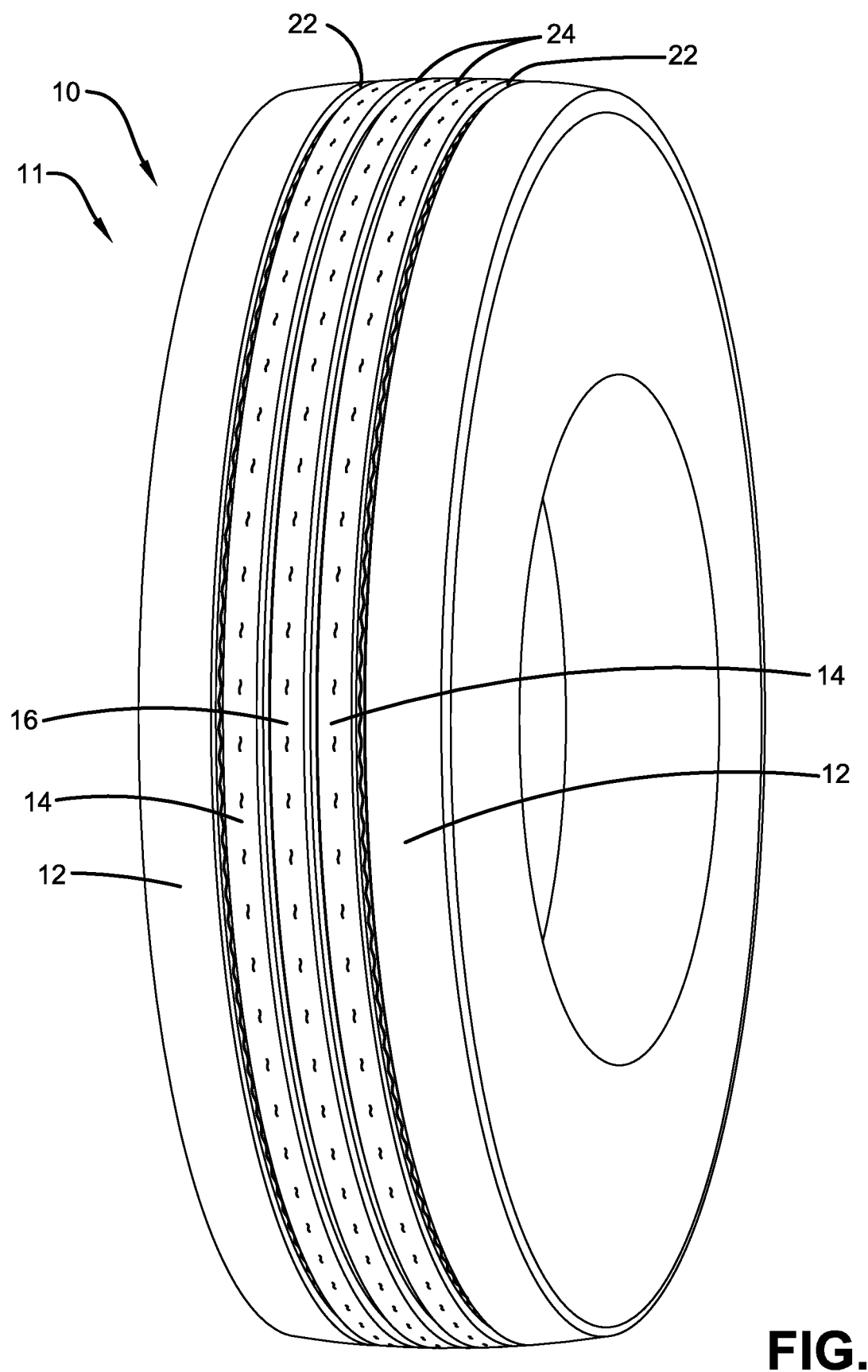
FIG. 1 is a schematic perspective view of a tire in accordance with the present invention.
Figure 2:
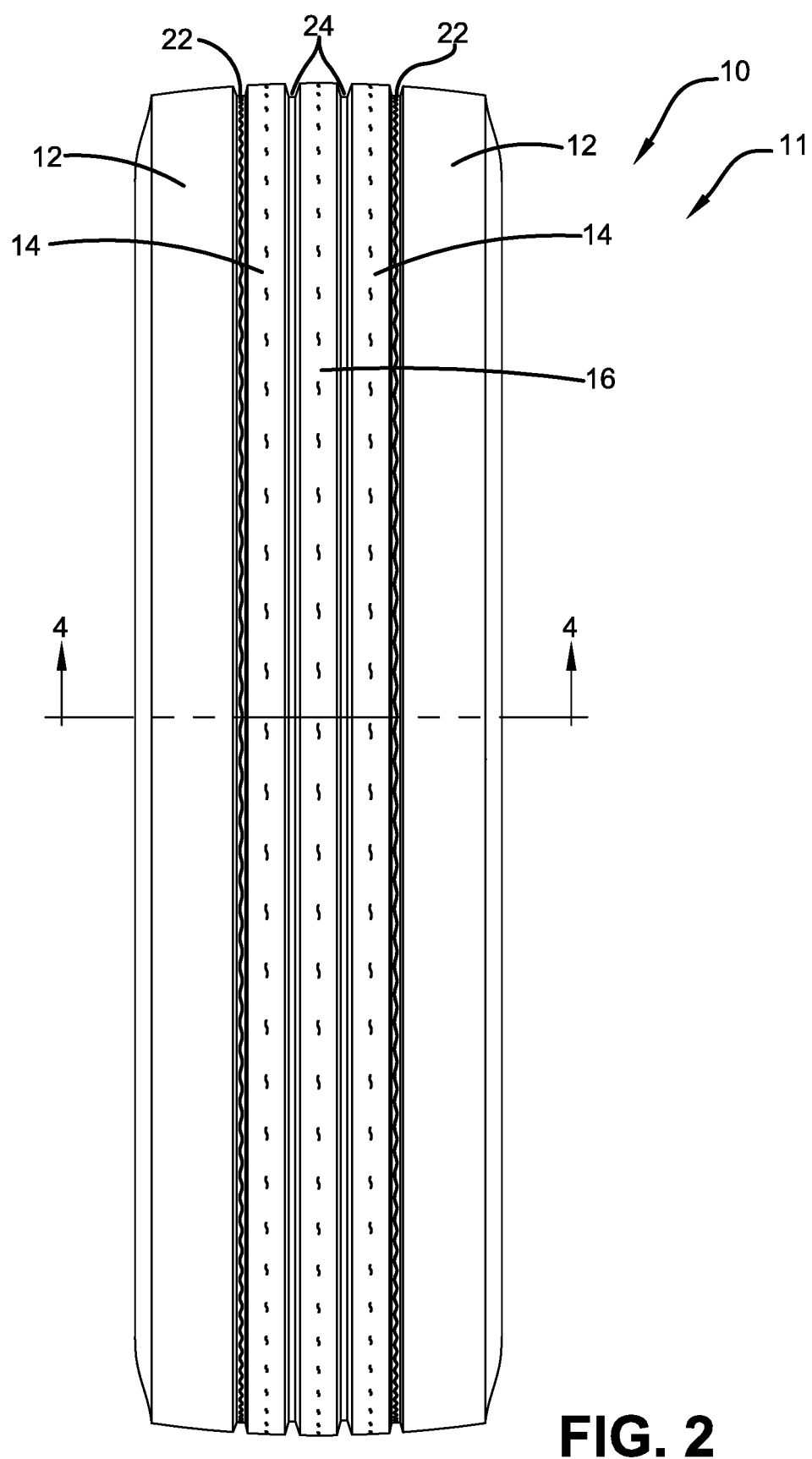
FIG. 2 is a schematic orthogonal view of the tread of the tire of FIG. 1.
Figure 3:
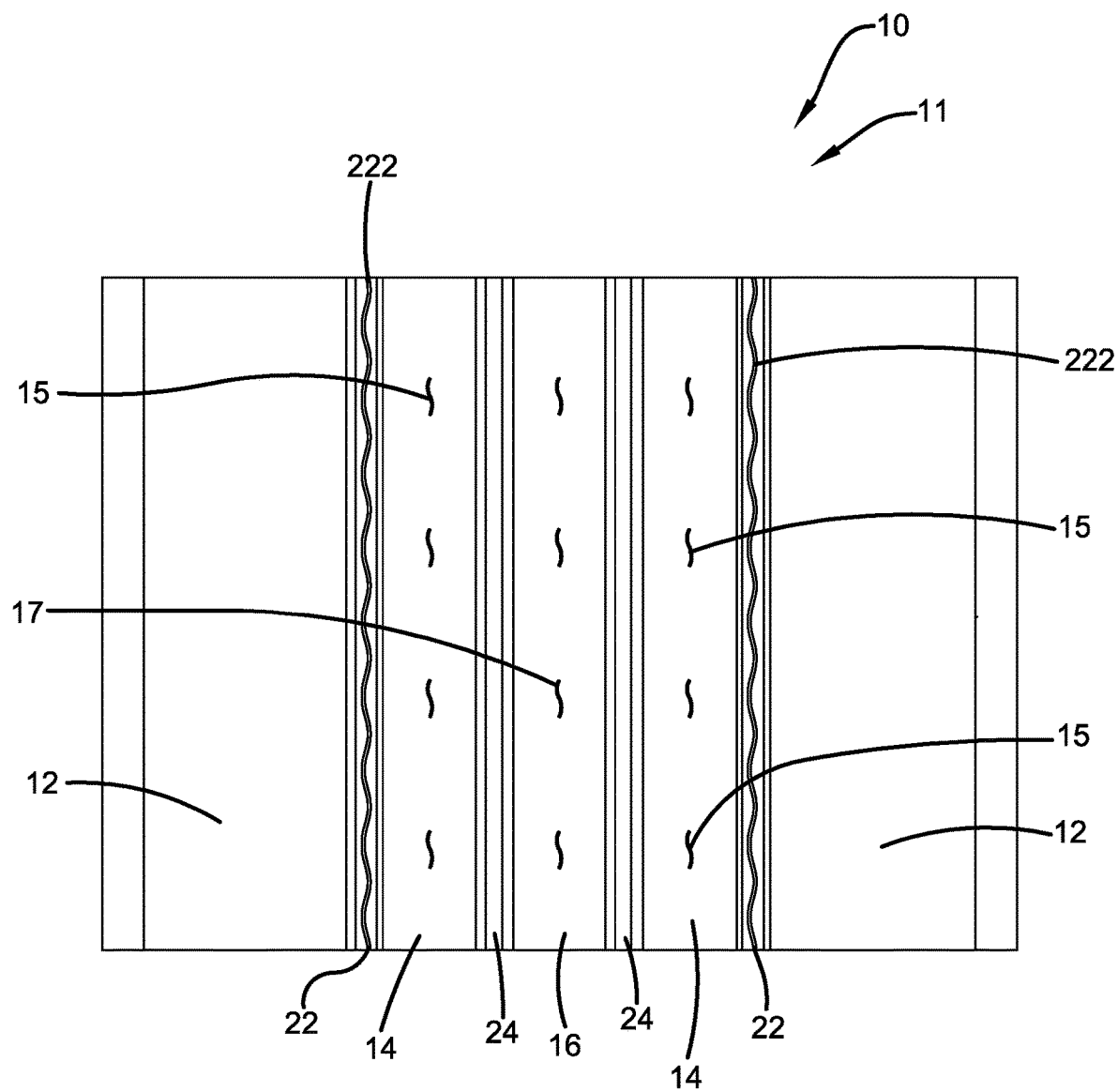
FIG. 3 is a schematic detail view of the tread of FIG. 2.
Figure 4:
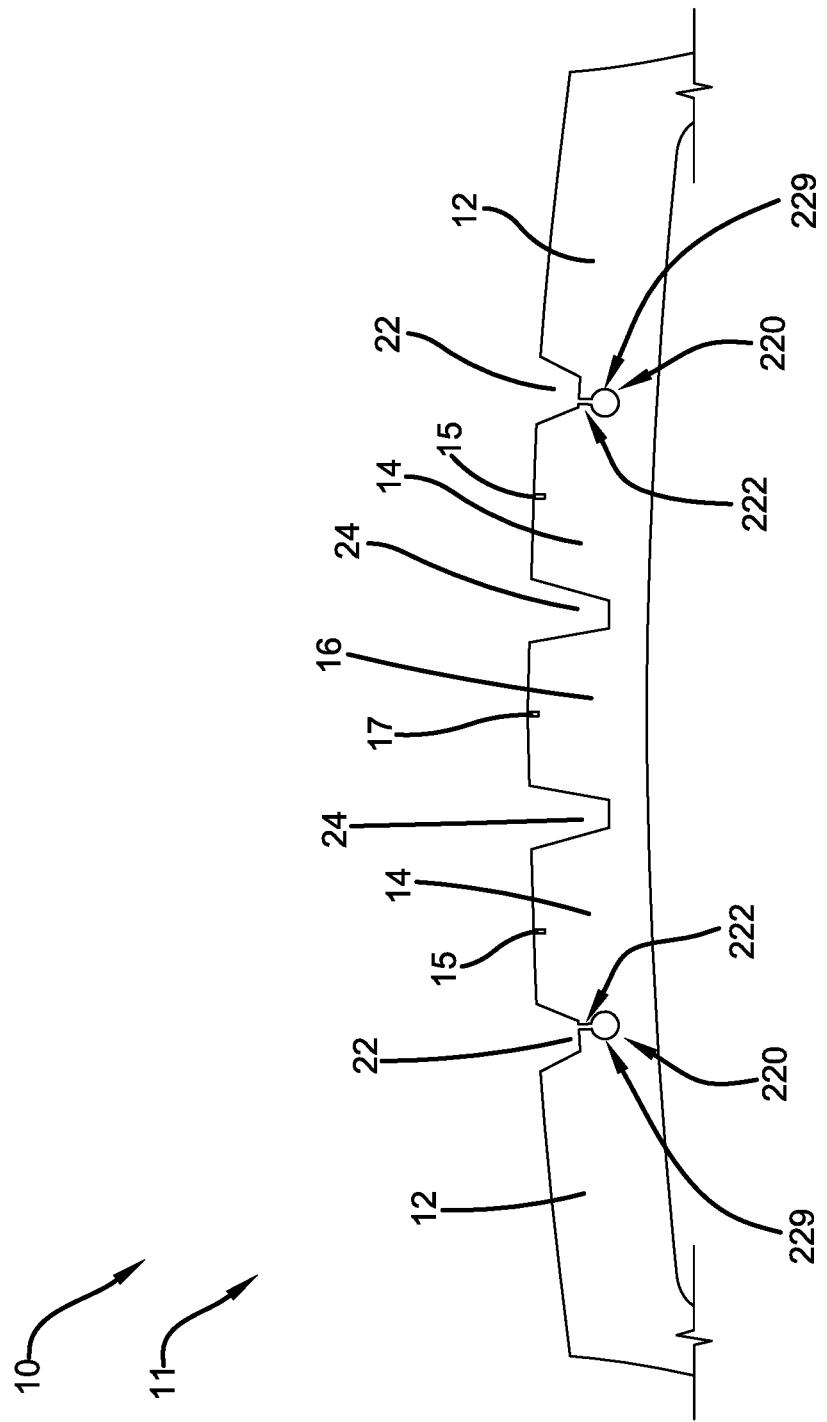
FIG. 4 is a schematic section view taken along the line "4-4" in FIG. 2.

A similar tread construction is disclosed in US 2019/0168546, incorporated by reference herein in its entirety. Referring now in more detail to the drawings, the present invention will below be described in more detail. The pneumatic, or non-pneumatic, tire 10 illustrated in FIGS. 1-5 may have a tread 11 defined by intermediate circumferential first shoulder ribs 12, intermediate circumferential second ribs 14, and a center intermediate circumferential third rib 16. The intermediate circumferential ribs 12, 14, 16 may be defined by two stabilizing circumferential grooves 22 and two central circumferential grooves 24. The two central circumferential grooves 24 may each have a trapezoidal cross-section with slanted walls and a flat bottom (FIG. 4). The intermediate circumferential second ribs 14 and the center intermediate circumferential third rib 16 may have wavy blind sipes 15, 17, respectively, for improving performance of the tread 11.

Figure 5:
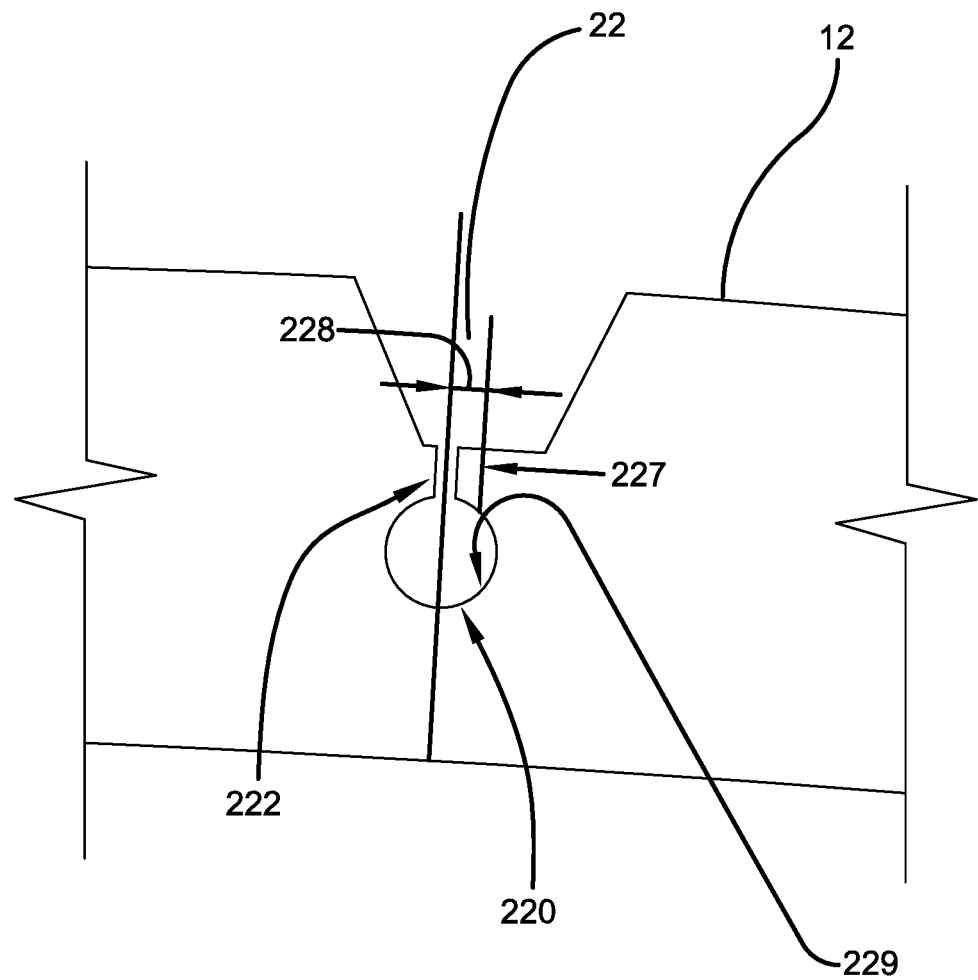
FIG. 5 is a detailed schematic view of part of the tread of FIG. 4.

The two stabilizing circumferential grooves 22 may also have a trapezoidal cross-section with slanted walls and a flat bottom, similar to the two central circumferential grooves 24. The radial depth of each stabilizing groove 22 may be more shallow (FIG. 4) or less (not shown) than the depth of the central circumferential grooves 24. The stabilizing groove depths may be about 50% of the central groove depths (FIG. 4). At the flat bottom of each stabilizing groove 22 may be a stabilizing structure 220. The stabilizing structures 220 may define circumferentially extending wavy subgrooves 222 of straight grooves (not shown) in the bottoms of the stabilizing grooves 22. As shown in FIG. 3, both the axial width of the subgrooves 222 and the axial width of the wave pattern may be less than the axial width of the bottoms of the stabilizing grooves 22. The subgrooves 222 may have curved, cylindrical radially innermost surfaces 229 to mitigate cracking and to increase axial flexibility of the stabilizing structures 222 (FIG. 5).

When an axially inward load is placed on the tread 11, such as while the vehicle is cornering, the axial width of the subgrooves 222 may shrink to as little as 0.0 mm (e.g., touching). Because of the wavy pattern of the subgrooves 222, the walls of the subgrooves may interlock thereby preventing relative circumferential movement between the walls of the subgrooves. This may provide an increase in stiffness of the tread 11 while cornering, without requiring increased overall stiffness of the tread during straight line movement of the vehicle.

In accordance with the present invention, the subgrooves 222 may be axially offset a predetermined amount 228 from a centerline 227 of the grooves 22. The amount 228 of offset may be varied to tune the cornering stiffness of the tread 11. If a subgroove 222 is offset toward the center rib 16 (FIGS. 4-5), the tread 11 around that subgroove may have less cornering stiffness than a subgroove at the centerline 227 of the groove 22. Conversely, if a subgroove 222 is offset away from the center rib 16 (not shown), the tread 11 around that subgroove may have greater cornering stiffness than a subgroove at the centerline 227 of the groove 22. No matter the axial position relative to the centerline 227 of the groove 22, the stabilizing structure 220 may mitigate cracking and increase axial flexibility of the tread 11 during non-cornering, straight line motion and rotation of the tire 10.

While the present invention has been described in connection with what is considered the most practical and preferred example, it is to be understood that the present invention is not to be limited to these described examples, but is intended to cover various arrangements which are included within the spirit and scope of the broadest possible interpretation of the appended claims so as to encompass all modifications and equivalent arrangements which are possible.

What is claimed:

1. A tread for a tire comprising:
   one or more grooves; and
   a circumferential main groove, the circumferential main groove having a cross-sectional shape formed of opposed slanted walls joined together by a circumferentially continuous flat bottom, wherein a stabilizing structure for increasing tread stiffness is positioned in the circumferential main groove, the stabilizing structure having a circumferentially continuous subgroove extending radially inward of the flat bottom of the circumferential main groove, the subgroove being axially offset from a centerline of the flat bottom of the circumferential main groove.

2. The tread as set forth in claim 1 wherein the stabilizing structure further includes an inner groove having a curved, cross-sectional shape that is positioned radially inward of the subgroove.

3. The tread as set forth in claim 1, wherein the one or more circumferential grooves have a cross-sectional shape having a pair of opposed sidewalls and a flat bottom surface joined to the opposed sidewalls, wherein the bottom surface of the one or more circumferential grooves has a radial depth greater than the radial depth of the flat bottom of the circumferential main groove.

4. The tread as set forth in claim 1, wherein the inner groove is axially offset from the centerline of the circumferential main groove.

5. The tread as set forth in claim 1, wherein the subgroove has a wavy pattern in the circumferential direction.

6. The tire of claim 1 wherein the subgroove is axially offset towards the centerline of the tire.

7. A system for increasing cornering stiffness of a tire tread comprising:
   a circumferentially continuous main groove having a cross-sectional shape formed of opposed slanted walls joined together by a circumferentially continuous flat bottom;
   a second circumferential main groove; and
   a stabilizing structure for increasing tread stiffness, the stabilizing structure having a circumferentially continuous subgroove extending radially inward of the flat bottom of the first main groove, the subgroove being axially offset from a centerline of the flat bottom of the first circumferential main groove.

8. The system as set forth in claim 7 wherein the subgroove has a curved, cylindrical radially innermost surface.

9. The system as set forth in claim 8 wherein an axial width of the subgroove shrinks to 0.0 mm under a predetermined operating condition.

10. The system as set forth in claim 9 wherein the subgroove has a first sidewall and a second sidewall interconnected by the curved, cylindrical radially innermost surface of the subgroove.

11. The system as set forth in claim 10 wherein the first sidewall abuts the second sidewall under the predetermined operating condition.

12. A tread for a tire comprising:
   A first circumferential groove and
   a first and second circumferential stabilizing groove, each first and second circumferential stabilizing groove having a cross-sectional shape formed of opposed slanted walls joined together by a circumferentially continuous flat bottom, wherein a circumferentially continuous subgroove extends radially inward of the flat bottom, the subgroove being axially offset from a centerline of the flat bottom of the circumferential main groove.

13. The tread of claim 12 wherein each subgroove is axially offset in a direction towards the centerline.

* * * * *